May 26, 1970

3,514,351

METHOD OF OBTAINING AN OPTICAL IMAGE TRANSFERABLE FIBER BUNDLE

Filed Oct. 7, 1965

INVENTOR

KUNIHIKO MUKAI

BY Holcombe, Wetherill & Brisebois

ATTORNEYS

May 26, 1970     KUNIHIKO MUKAI     3,514,351

METHOD OF OBTAINING AN OPTICAL IMAGE TRANSFERABLE FIBER BUNDLE

Filed Oct. 7, 1965     2 Sheets-Sheet 2

INVENTOR
KUNIHIKO MUKAI
BY Holcombe, Wetherill & Brisebois
ATTORNEYS

United States Patent Office 3,514,351
Patented May 26, 1970

3,514,351
METHOD OF OBTAINING AN OPTICAL IMAGE
TRANSFERABLE FIBER BUNDLE
Kunihiko Mukai, Tsu, Japan, assignor to Nippon Glass
Fiber Co., Ltd., Tsu, Japan
Filed Oct. 7, 1965, Ser. No. 493,705
Int. Cl. B32b 31/04, 31/18; B65h 54/00
U.S. Cl. 156—174                                    1 Claim

ABSTRACT OF THE DISCLOSURE

The present invention relates to a method of making a flexible optical image conductive cable which comprises the steps of coiling at least one continuous filament of optical image conductive material into a ring formed from a plurality of turns by leading said filament between guide means while urging each successive turn of said filament against the preceding turn so as to superimpose it thereon and form between said guide means a section of said ring in which those portions of said filament forming the successive turns of said coil lie parallel to each other in a single plane, bonding together the filament portions in said one section while leaving other filament portions free, forming a plurality of additional rings in like manner, superimposing and bonding together the bonded sections of said rings with the filament portions therein parallel to each other, and severing said rings transversely through said bonded sections.

---

The present invention relates to a method of obtaining an optical image-conductive fiber cable, and particularly relates to a method of making an optical image-conductive cable from small-diameter, optical image-conductive long fibers or filaments, for example, small-diameter long glass fibers, or small-diameter long fibers of synthetic resin.

The objective of this invention is to provide a method of making an optical image-conductive cable from long synthetic resin filaments under definite conditions, said synthetic resin filaments being formed with a cover layer of low-refractive transparent synthetic resin around a core of high-refractive transparent synthetic resin; or of making an optical image-conductive cable from long glass filaments under definite conditions, said glass filaments being formed with a cover layer of low-refractive transparent glass around a core of high-refractive transparent glass.

Another objective of this invention is to provide a method of manufacturing this special fiber cable, said method being characterized by the steps of forming a plurality of parallel fibers into an annular band in one zone of which the fibers are parallel to each other and lie in a single plane; super-posing and bonding the zones of a plurality of such bands together, and cutting the resulting annular cable near the middle of the section formed by the bonded zones so that the cut portion forms the two ends of the final cable.

According to the present invention, the above-mentioned optical image-conductive fiber cable can be easily and economically produced, using simple equipment.

Other objectives and advantages of this invention will become apparent upon reading the following description of a preferred embodiment of this invention with reference to the attached drawing, in which.

Figure 1:
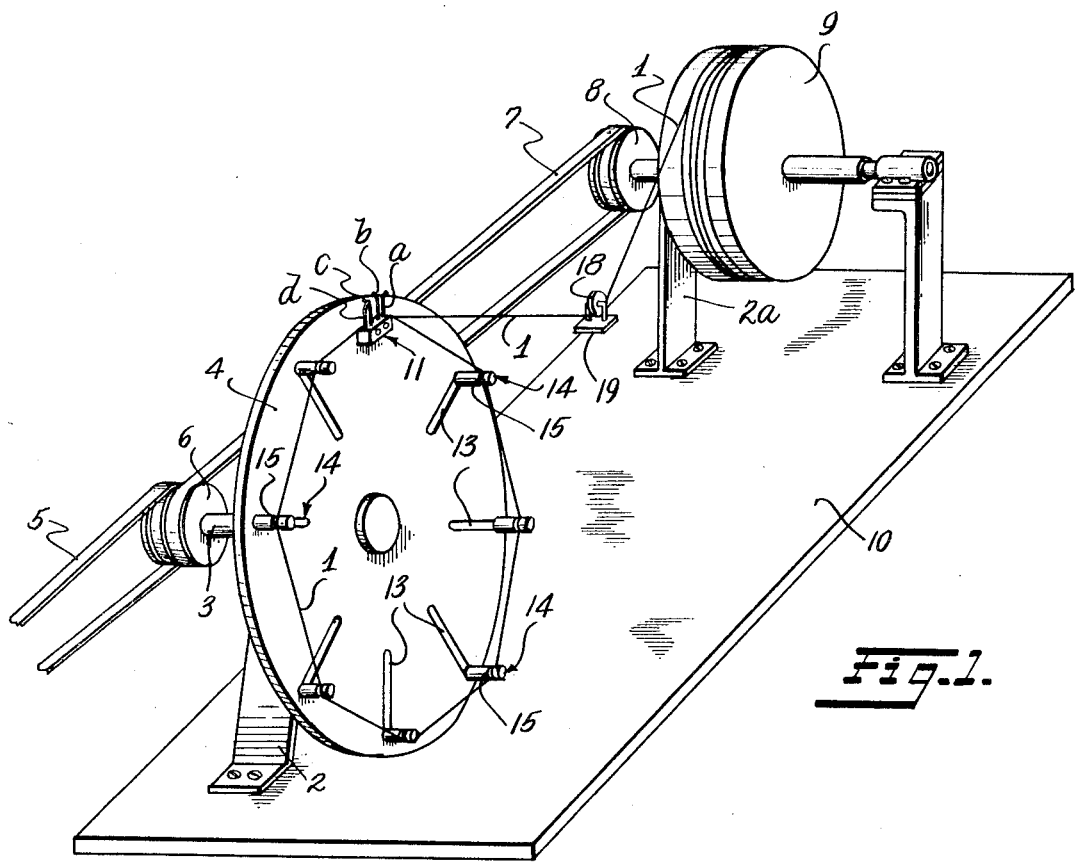
FIG. 1 is a perspective view showing apparatus to be used in making an intermediate product used in manufacturing a cable according to the present invention.

FIG. 1 shows a machine for manufacturing an intermediate product as a first step in the process. A rotating disc 4 for winding the fiber is fixed to the rotating shaft 3 carried by the bearing 2 set up on the base 10. This disc is driven in the direction indicated by the arrow through reduction gearing (not shown), the belt 5 and the belt pulley 6 by a motor (not shown). A drum 9 at the other end of the base is mounted on a rotating shaft carried in another bearing 2a and driven from the pulley 6 through the belt 7 and pulley 8. This drum carries a long strand of optical image-conductive fiber, which is drawn off the drum and rewound on the disc 4 when the drum and disc are rotated.

Figure 2:
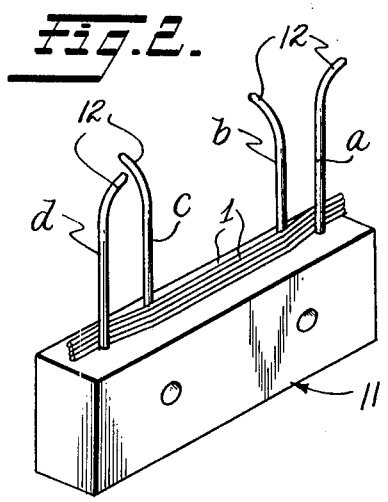
FIG. 2 is a perspective view showing on an enlarged scale the fiber guide of the apparatus shown in FIG. 1.
Figure 3:
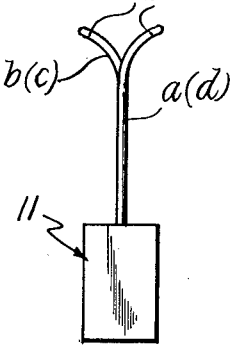
FIG. 3 is an end view showing said fiber guide.

The disc 4 has a fiber guide 11 mounted near its periphery. As seen in FIGS. 2 and 3, the fiber guide 11 has on its top four fiber-guiding needles a, b, c, d, each with a curved upper tip 12, mounted in pairs. These guiding needles a, b, c, d are arranged as shown in FIG. 3 in a straight line, with the curved tips of a and d leaning to the right and those of b and c leaning to the left.

Figure 6:
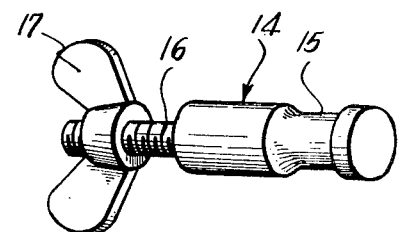
FIG. 6 is a perspective view of a fiber-guiding pin.

A plurality of radially extending slots 13 in the disc 4 are respectively pierced by the threaded bases 16 of fiber supporting pins 14 provided with grooves 15 as shown in FIG. 6. Depending on the length of the optical image-conductive fiber cable to be produced, the pins 14 are shifted to appropriate positions in the long grooves 13 and retained in said positions by thumbscrews 17 threaded onto the ends of the pins which project from the back of the disc 4.

Figure 7:
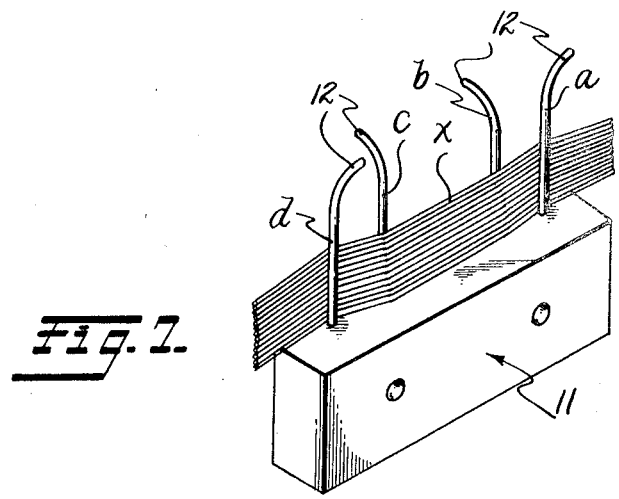
FIG. 7 is a perspective view showing the manufacture of an intermediate product.
Figure 8:
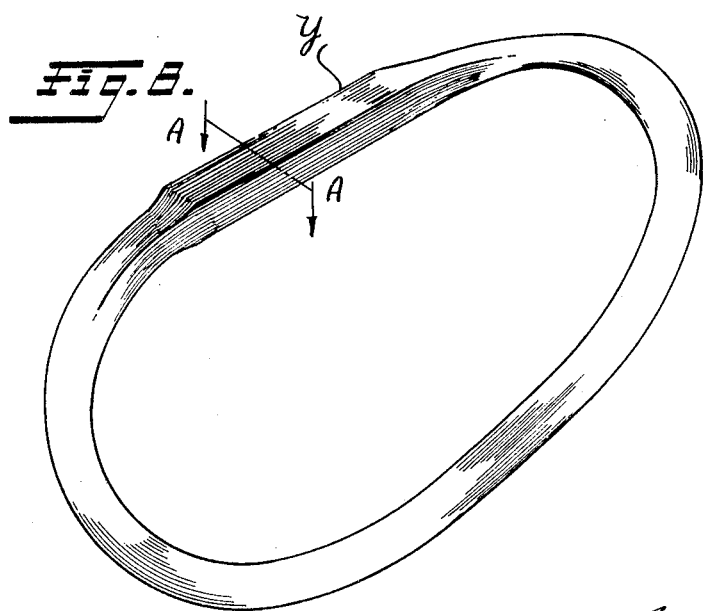
FIG. 8 is a perspective view of an optical image-conductive fiber cable just before completion.
Figure 9:
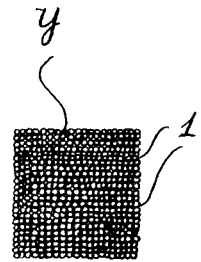
FIG. 9 is an end view of the optical image-conductive fiber cable as completed.

When the long fiber 1 is drawn off the drum 9, it is stretched taut by a take-up consisting of the pulley 18 and the light weight 19, and rewound over the fiber-guide 11 and the pins 14 on the disc 4. The long fiber 1 weaves around the guiding needles a, b, c, d on the fiber guide 11 as shown in FIG. 2 and each successive turn is superposed on the previous turn, forming a zone (see FIG. 7) in which sections of the fiber 1 are successively arranged in close contact within a single plane. Thus, when the fibers in this zone are bonded together and the portion of the long fiber 1 which has been unwound from the drum 9 is cut off, a band x composed of only long fibers is obtained. This endless intermediate product containing a band x is taken down from the rotating disc 4 and many such intermediate products are superposed one over another at said band x and then bonded together, giving a laminated portion y comprised a long fibers regularly arranged as shown in FIG. 9. When the central part of this laminated portion is cut transversely along A—A, a single piece of optical image-conductive fiber cable with one-half of the laminated portion y at each end is obtained. Since the fibers intermediate the end portions are not bonded together the cable may be flexed and bent at will.

Figure 4:
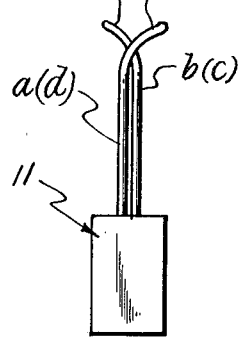
FIG. 4 is an end view showing an alternative type of fiber guide.
Figure 5:
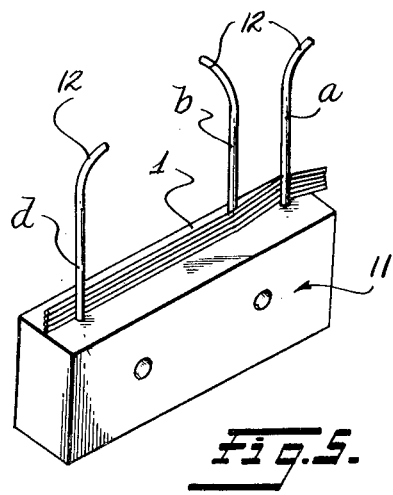
FIG. 5 is an end view showing still another type of fiber guide.

The rotating disc 4 need not always be of the same shape and structure as shown in the drawings; it need only be a spinning body of approximately round shape with at least three fiber-guiding needles positioned in proper alignment within a limited zone on its periphery. The fiber-guiding needles a, b, c, d on the fiber guide 11 need not always be in a straight line as shown in FIG. 3; but may be arranged in staggered fashion as shown in FIG. 4. Alternatively, three needles $a$, $b$, $d$ may be positioned as shown in FIG. 5 on the fiber guide 11, or 5 or 6 needles may be positioned thereon. The drum may, of course, carry a plurality of parallel fibers rather than a single fiber.

In the optical image-conductive fiber cable thus obtained, an optical image can be transmitted from one end thereof to the other, even though there may be a difference in length between component fibers or arbitrary curvature at an intermediate point along the cable. If one end of the optical image-conductive fiber cable is, for instance, inserted through the esophagus into the stomach, it will be possible to observe or photograph the state of the interior wall of the stomach at the other end of said cable. Thus, this invention permits direct observation of the interior wall of the stomach.

As described above, according to this invention a medically useful optical image-conductive fiber cable can be easily and economically made using simple equipment; and in the said cable the fibers in the laminated portion are regularly arranged in all directions transverse to its longitudinal axis.

What is claimed is:

1. A method of making a flexible cable for conducting optical images, which method comprises the steps of coiling at least one continuous filament of optical image-conductive material into a ring formed from a plurality of urging each successive turn of said filament against the turns by leading said filament between guide means while preceding turn so as to superimpose it therein and form between said guide means a section of said ring in which those portions of said filament forming the successive turns of said coil lie parallel to each other in a single plane, bonding together the filament portions in said one section while leaving other filament portions free, forming a plurality of additional rings in like manner, superimposing and bonding together the bonded sections of said rings with the filament portions therein parallel to each other, and severing said rings transversely through said bonded sections.

References Cited

UNITED STATES PATENTS

| | | | |
|---|---|---|---|
| 3,033,731 | 5/1962 | Cole | 156—175 |
| 3,104,191 | 9/1963 | Hicks et al. | 156—174 |
| 3,215,029 | 11/1965 | Woodcock | 156—174 XR |
| 3,236,710 | 2/1966 | Curtiss | 156—175 XR |
| 3,249,480 | 5/1966 | Siegmund | 156—182 XR |

JOHN T. GOOLKASIAN, Primary Examiner

D. J. FRITSCH, Assistant Examiner

U.S. Cl. X.R.

156—175, 182, 433; 350—96